Figure 3:
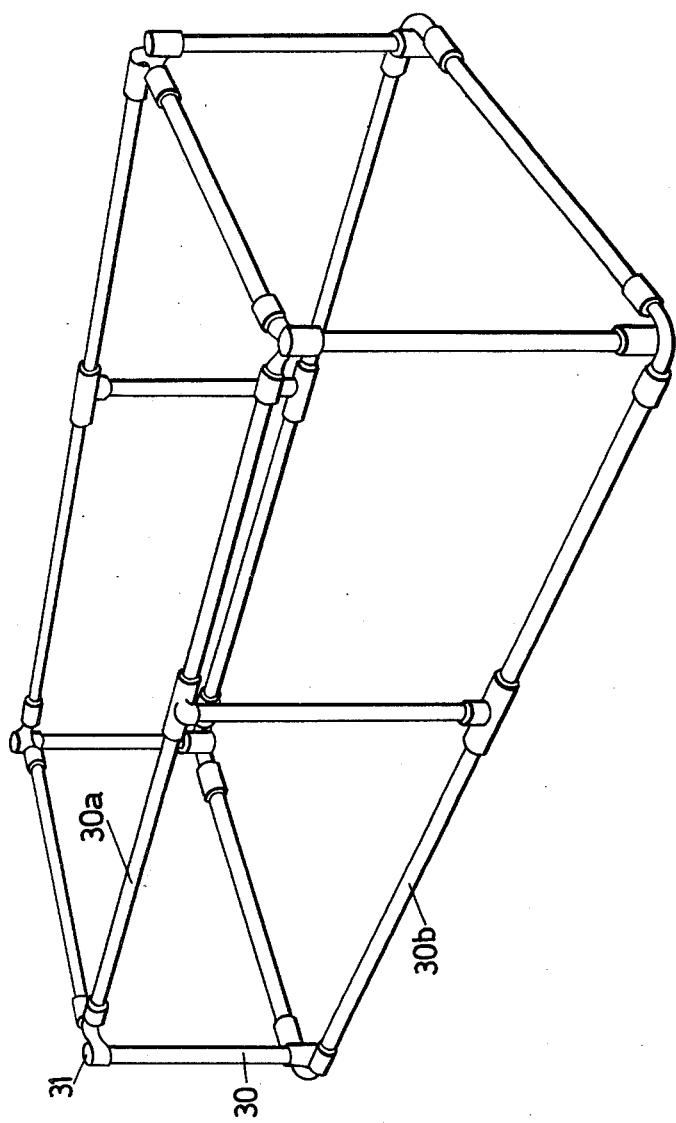

United States Patent [19]

Robinson

[11] 4,139,115

[45] Feb. 13, 1979

[54] CONTAINER WITH REINFORCING FRAME

[75] Inventor: James D. Robinson, Welwyn Garden City, England

[73] Assignee: Imperial Chemical Industries Limited, London, England

[21] Appl. No.: 495,037

[22] Filed: Aug. 5, 1974

[30] Foreign Application Priority Data

Aug. 7, 1973 [GB] United Kingdom ............... 37369/73

[51] Int. Cl.² ............................................... B65D 1/34
[52] U.S. Cl. ........................................ 220/74; 220/84; 220/461
[58] Field of Search ........................ 220/64, 71, 72, 83, 220/84, 73, 74, DIG. 11, 461; 285/423; 52/309; 264/247, 263

[56] References Cited

U.S. PATENT DOCUMENTS

| 2,676,729 | 4/1954 | Neville, Jr. et al. | 220/71 |
| 2,753,642 | 7/1956 | Sullivan | 220/DIG. 14 |
| 2,817,484 | 12/1957 | Stenzel | 220/71 |
| 2,951,780 | 9/1960 | Bushman | 264/247 |
| 2,964,211 | 12/1960 | Pfeffer | 220/19 |
| 3,286,876 | 11/1966 | Ring | 220/71 |
| 3,378,164 | 4/1968 | Witzgall | 220/73 |
| 3,382,625 | 5/1968 | Kuss | 220/84 |
| 3,393,821 | 7/1968 | Verlinden | 220/5 R |
| 3,442,418 | 5/1969 | Stromberg | 220/73 |
| 3,451,452 | 6/1969 | Marshall et al. | 220/71 |
| 3,505,769 | 4/1970 | Miron et al. | 52/309 |
| 3,589,972 | 6/1971 | Greig et al. | 52/309 |
| 3,742,985 | 7/1973 | Rubenstein | 52/309 |
| 3,743,561 | 7/1973 | Koontz et al. | 264/263 |

FOREIGN PATENT DOCUMENTS

| 290783 | 5/1963 | Australia | 220/71 |
| 283695 | 4/1964 | Australia | 220/71 |
| 1158158 | 7/1969 | United Kingdom | 220/71 |

Primary Examiner—William T. Dixson, Jr.
Assistant Examiner—Joseph M. Moy
Attorney, Agent, or Firm—Cushman, Darby & Cushman

[57] ABSTRACT

Large containers are injection moulded or vacuum formed around a framework which becomes part of the final article. This gives good strength and rigidity.

6 Claims, 4 Drawing Figures

U.S. Patent  Feb. 13, 1979  Sheet 1 of 4  4,139,115
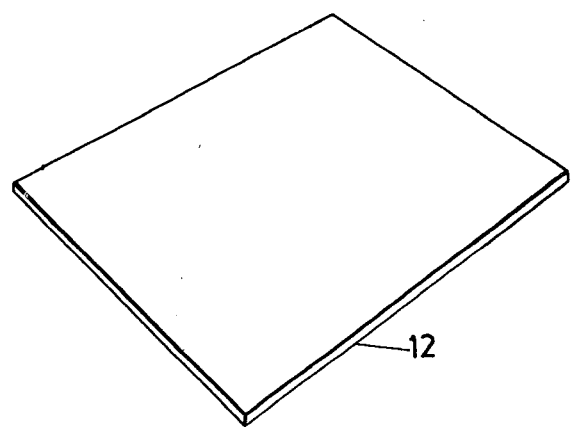
FIG.1.
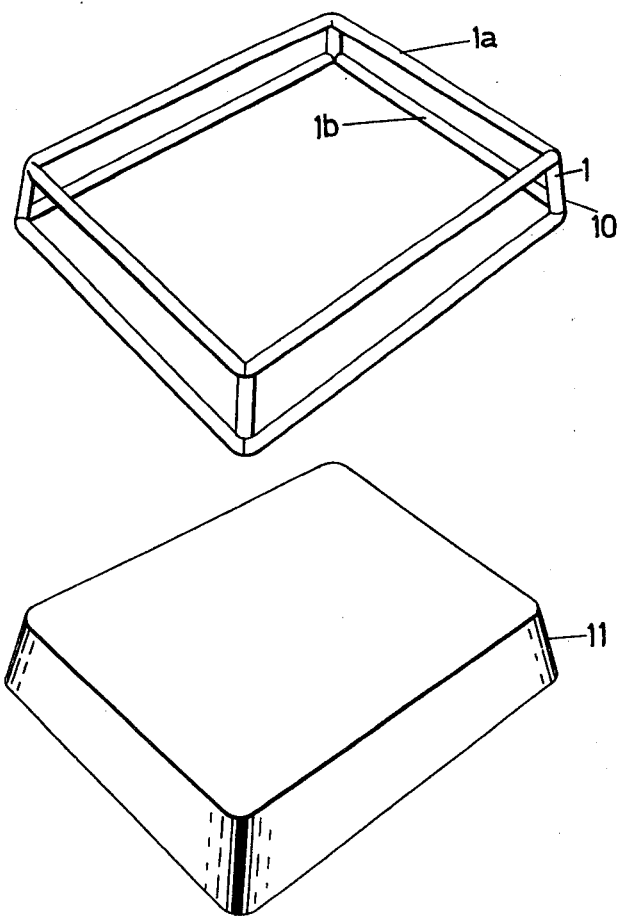

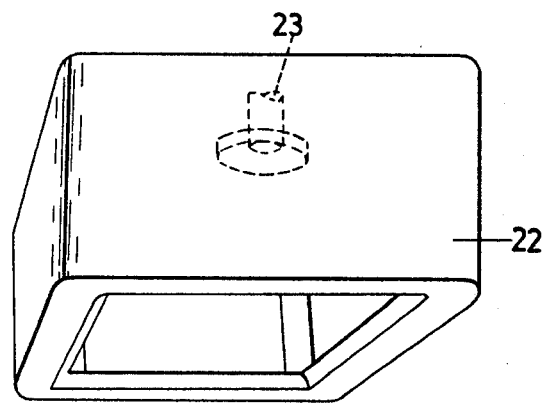
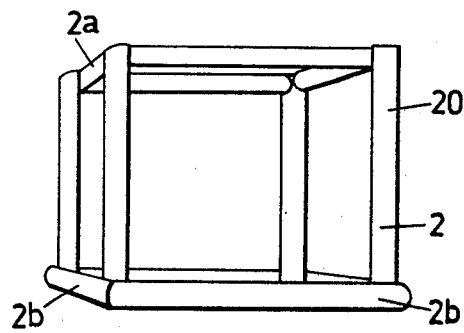
FIG.2.
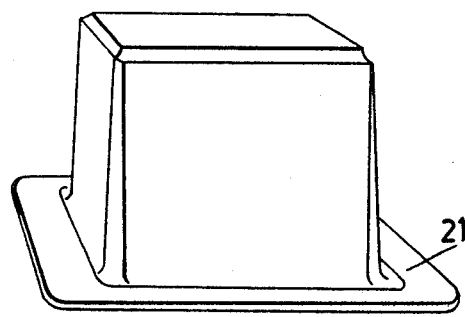

CONTAINER WITH REINFORCING FRAME

This invention relates to thermoplastics containers, especially to large containers having a carrying capacity of for example 0.5 m³ or more and which are rigid enough to carry soft fruit without a serious danger of the fruit being crushed by outside forces during transit.

Thermoplastics containers are well known but it is difficult to achieve adequate rigidity in large containers without resorting to prohibitively expensive thick sections or to extensive ribbing involving the use of complex moulds. The use of reinforcing metal inserts is unsatisfactory because differential expansion leads to a weakening of the structure and careless positioning of the metal inserts in a mould can lead to severe damaging of the mould during the moulding cycle. Metal inserts also add to the weight of the container and they may also induce degradation of the thermoplastics material.

By this invention we provide a rigid thermoplastics container comprising walls formed from thermoplastics material and supported on thermoplastics members wherein the members of the framework are at least partially covered with a coating of thermoplastics material integral with the walls. Also by this invention we provide a method of making a rigid thermoplastics container comprising placing an open framework composed of interconnected thermoplastics members into a mould and thereafter moulding a thermoplastic polymer in the mould so as to form the walls of the container and to at least partially cover the members of the framework with a coating of thermoplastic material which is integral with the walls.

The framework is preferably formed of tubular members for example extruded thermoplastics tubes or extruded thermoplastic structural foams having a circular section. The members of the framework are preferably formed from the same thermoplastics material as are the walls of the container. Alternatively the members of the framework may optionally be formed from fibre reinforced material, especially glass fibre reinforced tubes.

The framework may be conveniently assembled by welding together members of a suitable length or by joining the members by means of unions, for example unions provided with three sockets disposed at suitable angles. It is an important preference that when the container is in the carrying position, no two horizontal members of the framework should lie in the same vertical plane but instead a horizontal member should be offset a little to the left or right of the horizontal member immediately above or below.

The walls of the container may be made from for example crystalline polyolefins such as low or high density polyethylene or more preferably polypropylene or a copolymer of propylene with up to 25% by weight of ethylene. The walls may optionally comprise a foamed core sandwiched between opposed solid thermoplastic skins.

The moulding may be carried out by:
(a) placing the framework around a vacuum forming mould and vacuum forming a sheet of a thermoplastic polymer on to the framework;
(b) Placing the framework in a mould and injection moulding on to the framework.

Figure 4:
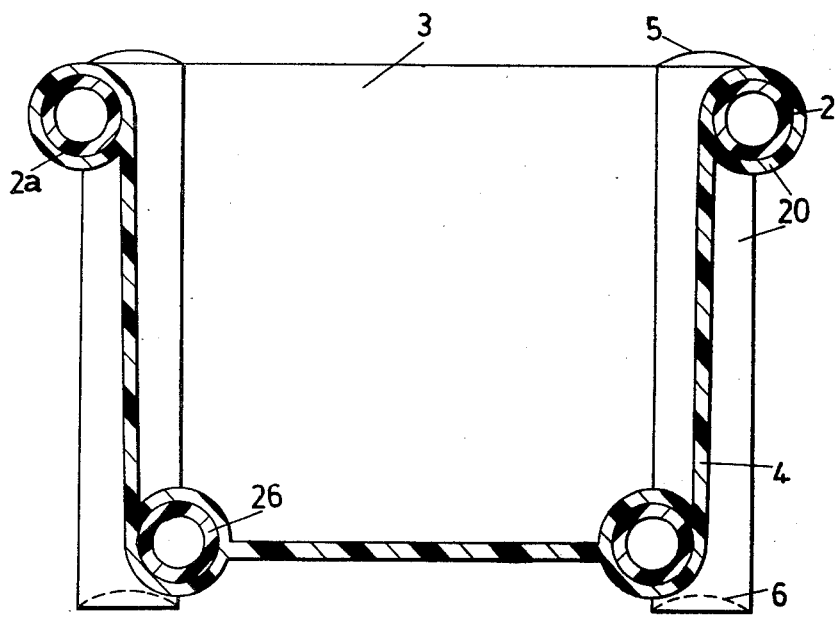

Embodiments of the invention will now be illustrated with reference to the drawings in which FIG. 1 shows in exploded perspective a vacuum forming mould, a framework and a vacuum formable thermoplastics sheet, FIG. 2 shows in exploded perspective male and female parts of an injection mould and a framework, FIG. 3 shows in perspective a framework, FIG. 4 shows on a larger scale an elevation part in section of a container.

In FIG. 1 framework 10 comprises twelve tubes 1, 1a and 1b welded together. Tube 1a is offset either to the left or right of tube 1b.

A container is made by placing framework 10 over vacuum forming mould 11. A vacuum deformable sheet of polypropylene 12 is clamped in a frame (not shown) and heated to a temperature at which it is readily deformable. The mould 11 is raised carrying the framework 10 with it until framework 10 contacts the sheet 12 whereupon a vacuum is applied under the sheet 12 by means not shown whereby the sheet 12 is deformed to conform to the shape of the mould 11 to provide walls which define the finished container. In particular sheet 12 wraps itself partially round portions of the framework and partially coats these portions to form a coating with the wall. The finished container had excellent rigidity and strength.

FIG. 2 shows the male and female parts 22 and 21 of an injection mould and a framework 20 composed of tubes 2, 2a and 2b welded together. Tube 2a is offset to the left or right of tube 2b. The parts shown in FIG. 2 may be used to make the container 3 of FIG. 4, by placing framework 20 over female mould part 21 and then closing male mould part 22 over the framework 20 on mould part 21. Molten thermoplastic is injected into the closed mould via inlet 23 and surrounds portions of framework 20 and on cooling forms walls 4 which define container 3. The injected material coats framework 20 to form a coating integral with the walls which on cooling confers upon container 3 an excellent rigidity and strength particularly in directions diagonal of the container.

FIG. 3 shows an alternative framework comprising tubes 30 joined together by unions 31. Tube 30a is offset to the left or right of tube 30b.

FIG. 4 shows a container 3 having injection moulded walls 4 enclosing reinforcing tubes 2. Container 3 is formed with domed plug 5 capable of engaging with correspondingly dished plug 6 on a like container so that the containers can be easily stacked. The plugs 5 and 6 also prevent ingress of molten thermoplastic during moulding. Tubes 2 are lightly welded together.

Two containers as illustrated in FIG. 4 were made by injection moulding polypropylene around a tubular framework made from extruded polypropylene tubes welded together. One container was made from polypropylene having a melt flow index of 1.5 and the other was made from polypropylene having a melt flow index of 7.5. The melt flow indices were measured according to British Standard 2872/Part 1/105C of 1970 using a 2.16 Kg load but carried out at 230° C. instead of 190° C. The walls of the container were approximately 2 mm thick and the tubes used in the framework had an external diameter of 2 cm and an internal diameter of 1.6 cm.

It was found that coating of the tubular members produced a marked increase in the strength and rigidity of the framework. It was discovered that the combination of the coated framework and the walls of the container provided an efficient structure in terms of rigidity for a given weight. The containers would withstand a vertical crushing load of from 5 to 7 tonnes.

I claim:

1. A rigid container having thermoplastics walls defining an interior space, said container comprising an open framework constructed of interconnected thermoplastics members of polyolefin material which together define the general locations of the planes of said walls, said walls being molded integrally with coating polyolefin material molded on to said members, said coatings at least substantially surrounding each of said members, the transverse dimensions of said members being substantially greater than the thickness of said coatings and said walls.

2. A rigid container as in claim 1 having an open top and a closed bottom lying in spaced-apart parallel planes each of the framework members lying in the top plane being offset laterally with respect to the nearest member lying in the bottom plane.

3. A container according to claim 1 wherein the framework is composed of tubular members.

4. A container according to claim 1 wherein the framework is composed of members made from structural foam.

5. A container according to claim 1 wherein when the container is in the carrying position each horizontal member of the framework is offset to the left or to the right of the nearest horizontal member above or below.

6. A container as claimed in claim 1 wherever made from polypropylene or a copolymer of propylene with up to 25% (by weight of the copolymer) of ethylene.

* * * * *